Patented Mar. 7, 1939

2,149,894

UNITED STATES PATENT OFFICE 2,149,894

CARBON REMOVER

Eugene Lieber, Elizabeth, and William H. Smyers, Westfield, N. J., assignors to Standard Oil Development Company, a corporation of Delaware No Drawing. Application December 11, 1934, Serial No. 756,974

2 Claims. (Cl. 87—5)

This invention relates to improved compositions for removing or loosening carbon deposits such as occur in internal combustion engines and other deposits of more or less related nature such as charred food residues, and is an improvement over the compositions disclosed in application Serial No. 609,030, now Patent 2,042,191, filed May 3, 1932 by Hyym E. Buc and Raphael Rosen.

According to the original application referred to, an onium base was used as a carbon remover. By the term "onium base" is meant an organic base in which monovalent organic radicals are connected to an inorganic element to which, in turn, an hydroxyl group is attached but to which no hydrogen atoms are attached. These onium bases may be considered to have the type formula $R_nXOH$ in which $R_n$ are organic radicals not necessarily the same and X is one of the various onium base elements such as nitrogen, arsenic, phosphorus, sulfur, iodine, and various metals, for example, tin, bismuth, antimony and other elements capable of forming onium compounds. In general, any of the elements in the righthand column of the 4th, 5th and 6th groups of the periodic table are capable of forming such onium compounds. The subscript $n$ represents one less than the valance of X. Thus the compounds used in the present invention will be usually either tertiary or quaternary hydroxides, depending upon the valence of the onium base element.

The substituted radicals to be combined with the onium base element may be any monovalent organic radicals and may comprise either the same or different members in the same series, as methyl, ethyl, etc., or in different series, as alkyl, aryl, alcohols, or mixed or substituted groups. Also tertiary heterocyclic onium base compounds are suitable, for example, those of the pyridin type having a nitrogen atom in the ring, and the homologs of such compounds. The chief requirement is that all hydrogen atoms originally connected directly with the onium base element should be completely substituted by organic radicals.

Tetramethyl ammonium hydroxide is one of these onium bases which has proved successful; other examples are:

Tetraethyl ammonium hydroxide.
Tetraethanol ammonium hydroxide.
Diethyl-monomethyl sulfonium hydroxide.
Trimethyl tin hydroxide (this may be called trimethyl stannonium hydroxide).
Triphenyl tin hydroxide.

These onium bases have relatively high dissociation constants of the order of those of the alkali hydroxides and, according to the earlier application referred to, were found admirably suited when dissolved in water, alcohol or other suitable solvent for loosening or removing carbonaceous gummy deposits from pistons, rings, and other parts of internal combustion engines, resulting from the partial evaporation and decomposition of some of the lubricant.

It has been discovered and is a primary feature of the present invention that the above described onium bases may be used in the form of emulsions in which form they possess certain advantages over the aqueous or alcoholic solutions previously disclosed. For instance, although the aqueous solution of tetramethyl ammonium hydroxide does not corrode iron, steel, copper, zinc and other metals, yet it does corrode aluminum and it has now been found that the corrosion of aluminum is largely, if not completely, prevented when the onium base is used in the form of an emulsion prepared, for example, by emulsifying an aqueous solution of the onium base with a small amount of oil and an emulsifying agent. Suitable emulsions have been prepared by incorporating 10 to 20% of an emulsifying agent, such as oil-soluble sulfonates derived by treatment of petroleum lubricating oil with concentrated sulfuric acid, triethanolamine oleate or ammonium rosinate, into an oil such as a refined lubricating oil and then forming an emulsion by mixing 25 to 35% of the solution of emulsifier in oil with 65 to 75% of 10% aqueous tetramethyl ammonium hydroxide. In general, oil-soluble sulfonates are preferred as the emulsifying agent particularly those prepared according to the application of Hyym E. Buc, Ser. No. 626,233, filed July 29, 1932 now Patent 1,981,799. The emulsions were found to be stable from 1 to 3 days or longer, in other words, long enough for the period of time in which they are to be used and it was found that such emulsions practically did not corrode aluminum at all.

Although the above described emulsions can be injected directly into the internal combustion engine through the spark plug holes or in any other convenient manner without taking the engine apart, yet it is preferred to take the pistons, rings, and other removable parts out of the engine and immerse them directly in a pan or other suitable vessel containing some of the onium base emulsion. These parts parts may also be contacted with the emulsion in any other suitable manner, such as by spraying, painting, etc.

A suitable emulsion for such purpose may be prepared, for example, by emulsifying together equal volumes of a light petroleum oil such as the kind commonly used for flushing automobile engines and a 10% solution of tetramethyl ammonium hydroxide, using as the emulsifying agent oil-soluble sulfonates frequently called "M" soaps and derived by treatment of petroleum distillates with concentrated sulfuric acid.

In addition to using the above described emulsions for removing carbon deposits from internal engines they may also be used for removing carbon deposits from ranges, oil burners, etc.

It has also been discovered that these onium base emulsions are adapted to remove still other types of carbonaceous deposits such as charred food residues from cooking utensils and are particularly useful for those made of aluminum. For example, if vegetables such as beans or peas, or fruits such as prunes, peaches, apricots, etc. are boiled in aluminum pans and through inadvertance the water is allowed to boil dry and the material being cooked becomes burnt it frequently happens that some of the charred residue adheres very tenaciously to the bottom and sides of the pan, so much so that even vigorous rubbing with abrasive materials, such as certain soaps or wire brushes, steel wool, etc., will not effectively remove the charred food residues without removing a considerable portion of aluminum from the inside surface of the pan. Certain soaps or chemicals having detergent effects have been used occasionally for such purposes but most, if not all, of those used heretofore either are insufficiently effective in removing the charred food residue or else exert an objectionably harmful dissolving effect on the aluminum. The onium base emulsion, prepared according to the present invention, has been found very effective in removing such charred food residues from aluminum cooking utensils without causing any substantial injury to the cooking utensil. As an example of such a use, an emulsion, prepared by emulsifying a 6% solution of tetramethyl ammonium hydroxide in water together with an equal amount of a 15% solution of oil-soluble sulfonate soap in a light lubricating oil, was allowed to stand overnight at room temperature in an aluminum pan containing charred residue from burned prunes and in the morning it was found that the charred residue had been completely loosened and was very readily removed with ordinary washing.

It is, of course, understood that this emulsion is also suitable for removing charred food residues from other types of cooking utensils such as enamel, granite, iron, etc. or any other surfaces with which these residues may be in contact, such as the top of burners or other parts of cooking stoves, although, if desired, an aqueous or alcoholic solution of the onium base may be used for removing charred food residues from such surfaces.

It is not intended that the invention be limited by any of the specific examples given but in the appended claims it is intended to claim all inherent novelty in the invention as broadly as the prior art permits.

We claim:

1. A carbon remover in emulsion form consisting of about 25–35% of a 10–20% refined petroleum lubricating oil solution of oil soluble sulfonates derived by treatment of a petroleum lubricating oil with concentrated sulfuric acid, and about 65–75% of a 10% aqueous solution of tetramethyl ammonium hydroxide, said oil solution and aqueous solution being emulsified together.

2. A carbon remover in emulsion form consisting of about 25 to 35% of a 10 to 20% refined petroleum lubricating oil solution of oil soluble sulfonates derived by treatment of a petroleum lubricating oil with concentrated sulfuric acid, and about 65 to 75% of a 10% aqueous solution of an organic onium base compound having dissociation properties equivalent to that of tetratmethyl ammonium hydroxide, said oil solution and aqueous solution being emulsified together.

EUGENE LIEBER.
WILLIAM H. SMYERS.